United States Patent
Kishi

(10) Patent No.: US 6,640,247 B1
(45) Date of Patent: Oct. 28, 2003

(54) RESTARTABLE COMPUTER DATABASE MESSAGE PROCESSING

(75) Inventor: Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/459,487

(22) Filed: Dec. 13, 1999

(51) Int. Cl.[7] .......................................... G06F 15/173
(52) U.S. Cl. ............................ 709/224; 707/2; 707/10; 707/225
(58) Field of Search ................... 709/224; 707/2, 707/10, 225

(56) References Cited

U.S. PATENT DOCUMENTS

| | | | | |
|---|---|---|---|---|
| 4,815,028 A | * | 3/1989 | Saitoh ........................ | 714/20 |
| 5,065,311 A | * | 11/1991 | Masai et al. ................. | 714/20 |
| 5,146,569 A | | 9/1992 | Yamaguchi et al. ........ | 395/375 |
| 5,455,926 A | | 10/1995 | Keele et al. ................ | 395/404 |
| 5,475,834 A | | 12/1995 | Anglin et al. .............. | 395/600 |
| 5,530,802 A | | 6/1996 | Fuchs et al. ........... | 395/182.15 |
| 5,706,500 A | * | 1/1998 | Dzikewich et al. ........... | 707/10 |
| 5,781,912 A | * | 7/1998 | Demers et al. ............. | 707/202 |
| 5,850,507 A | * | 12/1998 | Ngai et al. .................. | 707/202 |
| 5,931,955 A | * | 8/1999 | Kung ......................... | 707/202 |
| 5,956,489 A | * | 9/1999 | San Andres et al. ........ | 709/221 |
| 6,295,610 B1 | * | 9/2001 | Ganesh et al. ............. | 707/202 |
| 6,308,287 B1 | * | 10/2001 | Mitchell et al. ............ | 707/202 |

* cited by examiner

*Primary Examiner*—Ayaz Sheikh
*Assistant Examiner*—Syed A. Zia
(74) *Attorney, Agent, or Firm*—John H. Holcombe

(57) ABSTRACT

Messages for processing a database are protected during a termination and restart. An in-process message queue is coupled to a message reader and receives a copy of each read input message. A completion response detector monitors a valid completion response message to each read input message, and, upon detecting the valid completion response message, deletes the copied input message from the in-process message queue. Upon a termination and restart, a startup processor operates the message reader to read the input messages in the in-process message queue, and deletes the copied input message from the in-process message queue. The deletion thereby prevents any re-accessing of the copied input message upon a second restart, preventing a loop. The ease of termination and restart allows a special restart of the affected process of the database, rather than a system-wide termination and reboot.

19 Claims, 6 Drawing Sheets

RESTARTABLE COMPUTER DATABASE MESSAGE PROCESSING

Commonly assigned U.S. patent application Ser. No. 09/283,223, K. F. Day III et al. is incorporated for its showing of a data storage library system employing synchronization tokens for storing and tracking multiple copies of data in data storage libraries.

FIELD OF THE INVENTION

This invention relates to the processing of messages relating to computer databases, and, more particularly, to protecting database processing messages during a termination and restart.

BACKGROUND OF THE INVENTION

Availability is a key element of many computer systems, requiring that the systems be kept operating as much as possible with as little downtime as possible. In many businesses, system unavailability can have an immediate and lasting adverse impact on the business. Should a fatal error develop in most computer systems, the computer system must be stopped and rebooted. All in-process activities are lost, together with the in-process data. The data that exists typically is in the state of the last time data was saved before the processes that were stopped began, but there may be no assurance of the exact state of the data. Thus, in order to meet these mission-critical requirements, the system must be stable and keep running without loss of data.

One example of computer systems that must be kept operating as much as possible comprises servers which support a large number of clients in the mission-critical area and their access to the data they require to perform their jobs. The data is often maintained in disk drives, such as RAID systems, for short term access, and in data storage libraries for longer term access. For the systems to operate efficiently, both the disk drives and the data storage libraries must be kept operating on a continuous basis.

RAID systems provide a means of safeguarding the data by effectively duplicating the data such that one copy of the data will be available even if one of the disk drives fails. The incorporated Day III et al. application discloses data storage library systems in which redundant copies of data volumes are stored in two (or more) similar libraries. To save time, the data is first stored in one library and then copied to the other library. When the data is recalled, the most current copy must be accessed. The most current copy is ascertained by means of synchronization tokens which are directly associated with each data volume in each of the libraries. Thus, when a data volume is to be accessed, the synchronization tokens for the data volume in the libraries are accessed and compared to determine the most current. Then, the data volume is accessed from the library directly associated with the most current of the synchronization tokens.

Should an error occur in the synchronization token handling, the library controller managing, updating and comparing the synchronization tokens must be stopped and rebooted, thereby stopping the entire data handling process. The messages that were received for conducting the processing of the tokens may then be lost, and it may require inventories of both libraries in order to find the prior update status of each data volume, so that the most recent messages could be reviewed. Further, the messages that were lost would have to be reconstituted from the original source, which may not be possible. Simply finding a process to save all of the token messages for a period of time so that the tokens could be reconstituted may prove risky in that, if one of the messages caused the fatal error, again conducting the processing action of the message may again cause a fatal error, and an infinite retry loop may result.

The same problem exists with regard to processing any database that has a high degree of criticality and that may result in a fatal error.

SUMMARY OF THE INVENTION

An object of the present invention is to protect database processing messages so as to allow a termination and restart without requiring a system-wide reboot.

Disclosed are a computer message processor and a method which may be implemented in a computer program product for protecting database processing messages during a termination and restart, and a data storage library implementing the invention to protect synchronization token processing.

An in-process message queue is coupled to a message reader and receives a copy of each read input message. A completion response detector monitors a valid completion response message to each read input message, and, upon detecting the valid completion response message, deletes the copied input message from the in-process message queue. Upon a termination and restart, a restart processor operates the message reader to read the input messages in the in-process message queue, and deletes the copied input message from the in-process message queue. The deletion thereby prevents any re-accessing of the copied input message upon a second restart, preventing a loop.

The ease of termination and restart allows a special restart of the affected process of the database, rather than a system-wide termination and reboot.

The startup processor first operates the message reader to read all of the input messages from the in-process message queue and, only upon reading all the saved input messages from the in-process message queue, reading the new input messages.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
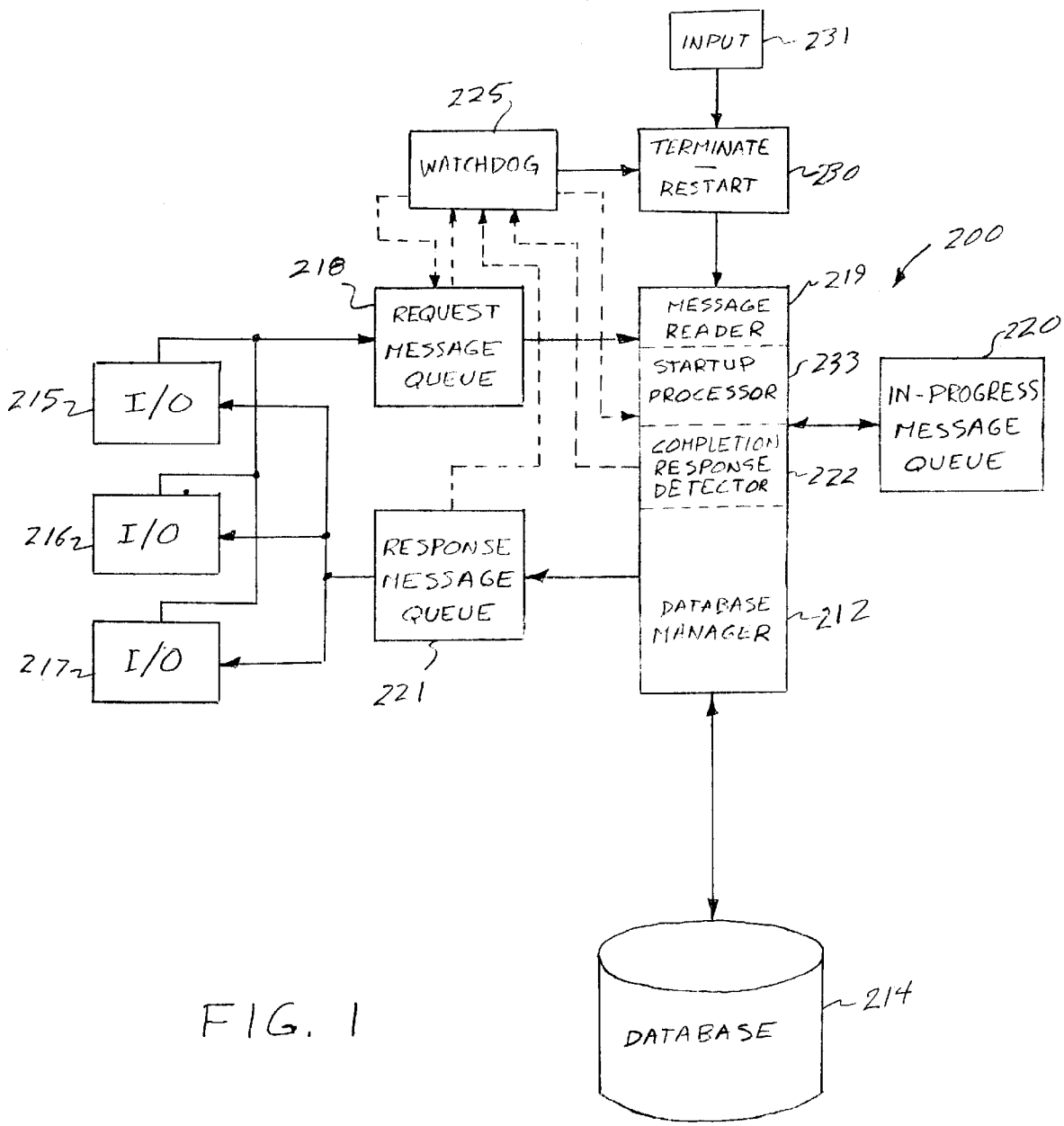
FIG. 1 is a block diagram of an embodiment of a computer message processor in accordance with the present invention, implemented with a database manager.

Referring to FIG. 1, a computer message processor 200 is illustrated in accordance with the present invention, and is shown as implemented with a database manager 212 that may work with a database 214. Various input/outputs 215–217 receive input messages from requesting processes. The input messages request that the computer message processor and database manager process items in the database 214, the processor supplying output responses to the input/outputs. The requesting processes may originate the input messages internally to the device in which the message processor resides or externally. As examples, in a library controller for a data-storage library, the requesting processes are processes requesting or sending information to the message processor, such as a virtual tape drive emulator, or an internal library controller process. The computer message processor and the database manager carry out processes specified in the input messages. The computer message processor 200 and the database manager may, for example, be implemented in at least one programmable computer processor, such as an IBM RS-6000 processor. The processor is provided with an operating system, and application programs for operating in accordance with the present invention. The application programs may comprise a computer program product, comprising computer readable program code. The computer program product may be supplied electronically, or alternatively, the computer program product may be supplied at an I/O station of the processor or from a storage media which stores executable computer instructions, and comprises an article of manufacture, as will be discussed.

As discussed above, the computer message processor, the database manager, or the operating system under which they run, may experience a fatal error and be stopped and rebooted, or may be stopped and initialized intentionally, e.g., in order to update the code. Such a stoppage will leave the system down for a considerable length of time, often 10–20 minutes, until the reboot or initialization is completed. In accordance with the present invention, should there be a need to stop the computer message processor 200, the entire system will not be stopped, and the computer message processor will be back in operation in a very short time after a startup signal is given, giving the appearance of continuous operation.

In the illustrated embodiment, the input messages are supplied from the input/outputs 215–217 to a request message queue 218. The request message queue places the messages in an order in which they will be processed, as is known to those of skill in the art, such as in a priority order.

A startup processor 233 operates a message reader 219 to read the message which is next in the processing order from the request message queue 218, and, as is typical, the message is deleted from the request message queue at that time. In accordance with the present invention, the message reader 219 places the message from the request message queue in an in-process message queue 220. The startup processor then issues the message to the module that operates the process, such as the database manager 212, so that the processing specified by the message may be conducted. Upon completion of the processing, a response message is placed in a response message queue 221, and a completion response processor 222 detects the completion, deleting the input message from the in-process message queue 220.

The response is provided to the input/output 215–217, as is known to those of skill in the art.

Queues are provided by many operating systems, such as AIX as is employed in the IBM RS-6000 processor, and application programs may. employ these queues for various purposes, as is known to those of skill in the art. In systems not providing the queues, queues may be established by providing the suitable program code, again as is known to those of skill in the art. The request message queue 218 and the response message queue 221 are typical of message processors. In accordance with the present invention, the in-process message queue 220 is provided to store the input messages.

A conventional watchdog 225 may be provided to monitor the request message queue 218, the response message queue 221, and the computer message processor 200, and may optionally also monitor the database manager 212. A watchdog monitors the process, looking for "stuck" or "dead" operations. As one example, a process may get into a loop and get "stuck". In another example, the process may attempt an illegal operation of the operating system and get dropped from the process table, terminating the process, and will "die". The watchdog may wait a predetermined time from the time the message was read from the request message queue 218, looking for a valid completion response at the response message queue 221. The watchdog may send a query, e.g., "ping", to the process 240 or through the request message queue 218, looking for a response that indicates the process is properly in progress. If there is no response, the watchdog may query the operating system to determine if the process is in the process table, and is "stuck", or is absent from the process table, and is "dead".

If the process has failed, the watchdog 225 sends a failure signal to a terminate/restart processor 230. Alternatively, the operating system or an operator may decide to terminate the computer message processor 200, and will so indicate at an input 231. The terminate/restart processor 230 then terminates the current operations of the computer message processor 200 providing a kill signal to the computer message processor.

Subsequently, in accordance with the present invention, upon completion of any action as the result of the termination, the terminate/restart processor 230 verifies the termination of the computer message processor and then provides a startup signal starting a new computer message process at startup message processor 233. The startup processor causes the message reader 219 to read input messages from the in-process message queue 220, thereby beginning the processing of messages at the same point that the termination occurred.

Further in accordance with the present invention, each message that has been read from the in-process message queue 220 is deleted from the queue. Thus, should the message be the cause of the termination, upon a second termination and restart, the message will have been erased from the queue and is unavailable. Therefore, it will not be possible for an infinite retry loop to form.

Figure 2:
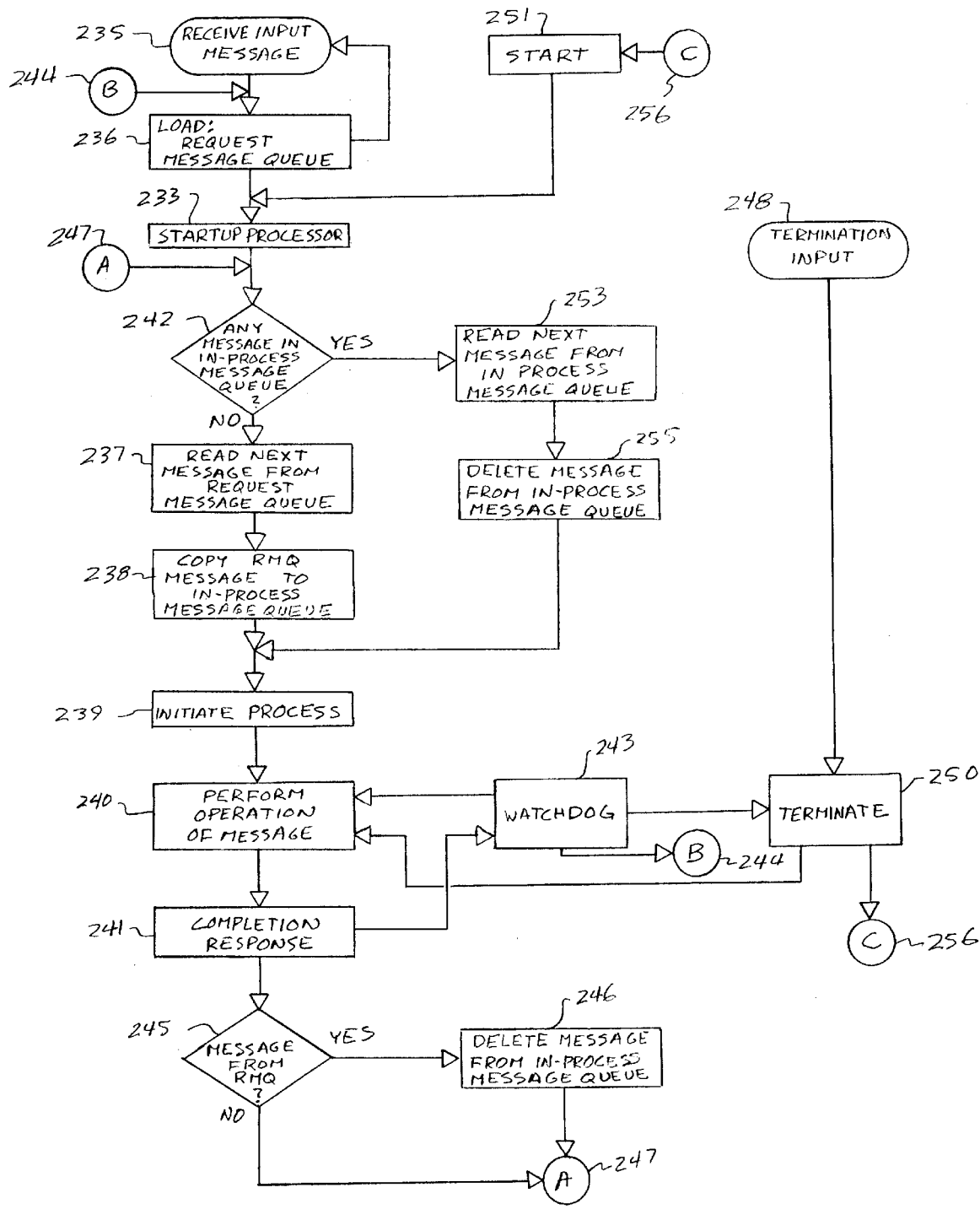
FIG. 2 is a flow chart depicting an embodiment of a computer implemented method in accordance with the present invention that may be employed with the computer message processor and database manager of FIG. 1.

FIG. 2 illustrates a computer implemented embodiment of the invention. Referring to FIGS. 1 and 2, an input message is received at one of the inputs 215–217 in step 235, and, in step 236, the input message is loaded into the request message queue 218. The input process then cycles back to step 235 for the next input message. As discussed above, the message queue, in step 236, may place the input messages in an order in accordance with a desired priority.

The startup processor 233, in step 242, determines whether any messages are in the in-process message queue 220. If not, the startup processor operates the message reader 219 to, in step 237, read the next message from the request message-queue 218.

In accordance with the present invention, in step 238, the message read from the request message queue by the message reader, is copied into the in-process message queue 220. In accordance with conventional practice, the message will have been deleted from the request message queue 218 when it was read by the message reader 219. Thus, the input message is protected temporarily in the in-process message queue.

The processing specified by the message is then initiated in step 239 and conducted in step 240, resulting in a completion response in step 241. As discussed above, the watchdog 225 monitors the process in step 243. For example, the watchdog may wait a predetermined time from the time the message was read from the request message queue 218, looking for a valid completion response at the response message queue 221 in step 241. Additionally, the watchdog may send a query or "ping" to the process 240 or through the request message queue 218 at step 236, via connector 244.

If the process completes normally in a reasonable time, step 245 determines whether the message was from the request message queue 218 or the computer message processor 200 is in a normal or a restart mode, as will be explained. If the processed input message came from the request message queue 218 as the result of step 237, the processor is in a normal mode. Thus, in step 246, the process deletes the message from the in-process message queue, indicating that the process of the message has been. completed and the message does not require protection and connector 247 leads back to step 242 to select the next message.

If, however, the watchdog, in step 243, detects a problem with the process, or if a termination input is provided at input 231 in step 248, the terminate/restart processor 230, in step 250, terminates the process by providing a kill signal.

Subsequently, in accordance with the present invention, upon completion of any action as the result of the termination, and verification of the termination by the terminate/restart processor 230, the processor, via connector 256, in step 251, provides a startup signal to the startup processor 233 of the computer message processor. The startup processor, in step 242, determines whether any message is in the in-process message queue 220, giving priority to those messages. In step 253, the next message is read from the messages saved in the in-process message queue 220 by the message reader 219, so that the processing of messages begins at the same point that the termination occurred.

In accordance with the present invention, the message read from the in-process message queue in step 253 is deleted from the queue in step 255. The process is again initiated in step 239, which leads to step 240 to perform the operation of the message. Again, watchdog 225, in step 243, monitors the process. Should a termination occur during the processing of the message read in step 253 and the computer message processor restarted in step 251, the message will have been deleted from the in-process message queue in step 255 and is lost. Thus, an infinite retry loop is prevented, and step 253 reads the next available message from the in-process message queue, or step 237 reads the next new message from the request message queue.

Upon completion of the process of step 240 and the completion response of step 241 for the message of step 253, step 245 determines that the computer message processor is in restart mode. Connector 247 leads back to step 242 and the in-process message queue 220 is checked to determine if any messages remain in the queue. If so, "YES", the next available message is read from the in-process message queue in step 253. If the in-process message queue has been depleted and all messages have been deleted in steps 255, "NO" in step 242, this leads to step 237 to read the next available message from the request message queue 218.

Thus, the startup processor 233 first operates the message reader 219 to read the all of the input messages from the in-process message queue 220 and, only upon reading all the saved input messages from the in-process message queue, operates the message reader to read the new input messages from the request message queue 218.

The database processing messages are protected so as to allow a termination and restart without requiring a system-wide reboot.

Figure 3:
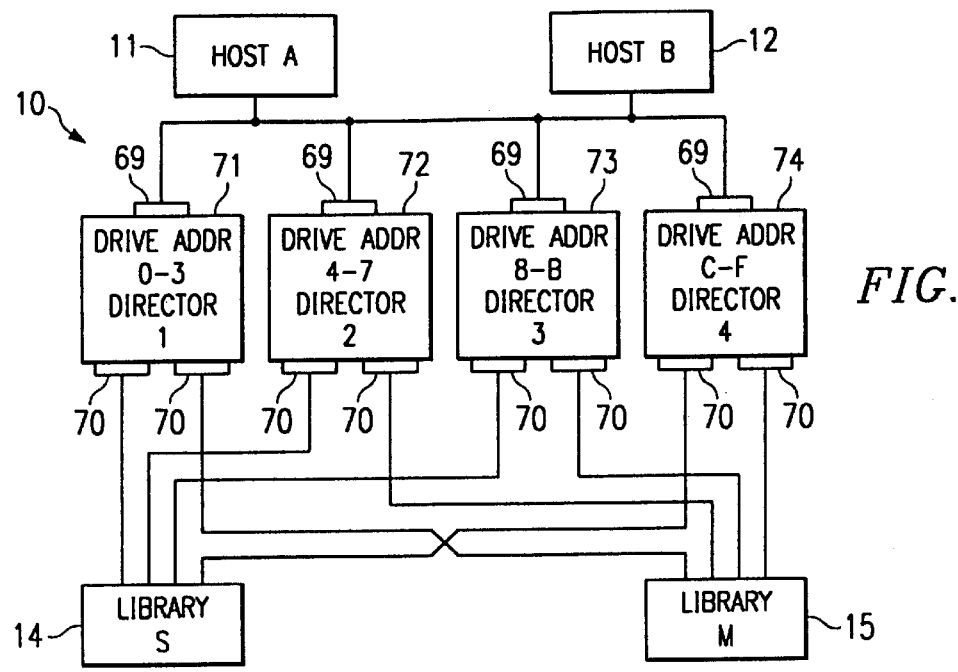
FIG. 3 is a block diagram showing interconnection of functional components of a data storage library subsystem that employs synchronization tokens to track multiple copies of data volumes.
Figure 4:
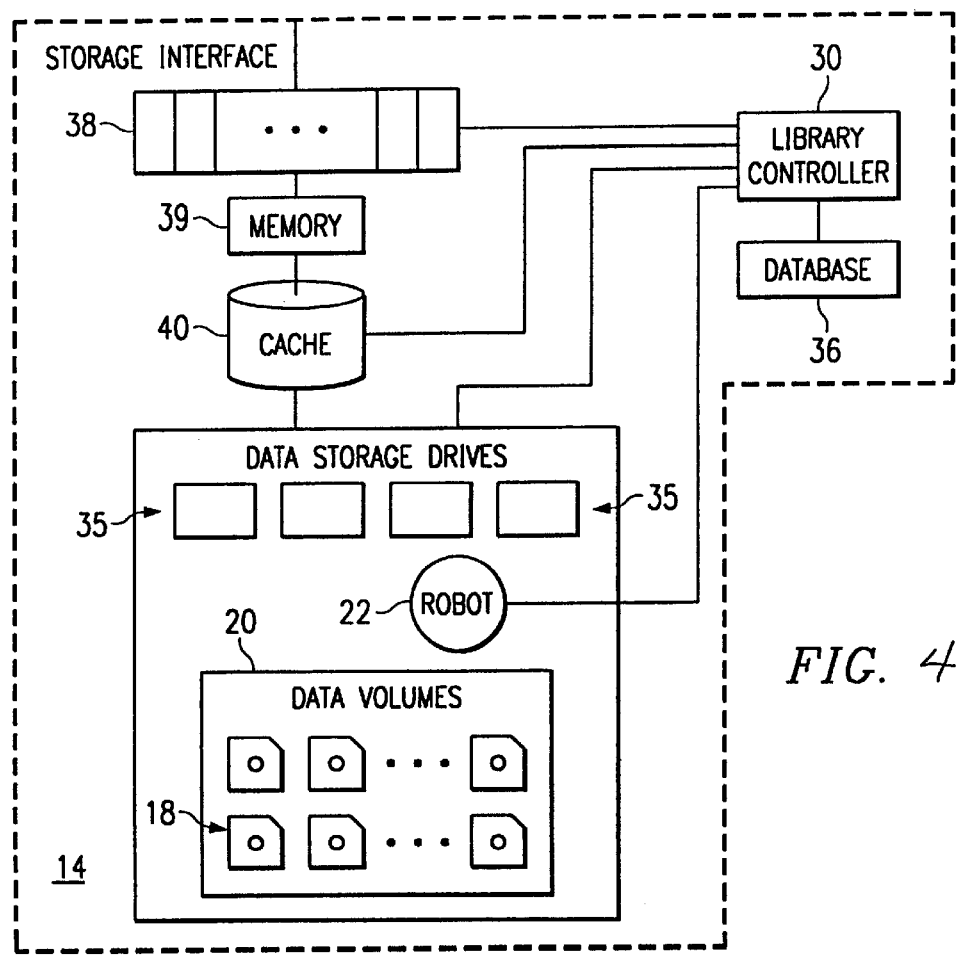
FIG. 4 is a block diagram showing functional components of an example of a data storage library of FIG. 3 employed in accordance with an embodiment of the present invention.

One implementation of the present invention may be with respect to accessing redundant copies of identifiable data volumes from a plurality of data storage libraries. The redundant copies are accessed from the libraries employing updatable synchronization tokens, each directly associated with an identifiable data volume, the synchronization tokens indicating the relative update levels of the directly associated redundant copies. A data storage library system is illustrated in FIGS. 3 and 4 in accordance with the incorporated Day III. et al. application. The key processing element in the Day III et al. application is the synchronization token handler and database in the library controller of each library, as will be explained. The present invention provides a means for protecting the database processing messages so as to allow a termination and restart without requiring a system-wide reboot.

Referring to FIG. 3, an embodiment of a data storage library system 10 is illustrated which redundantly couples host systems 11 and 12 to data storage libraries 14 and 15, via a plurality of directors 71–74, in accordance with the incorporated Day III et al. application. The Day III et al. application provides the directors for storing and tracking multiple copies of data in the data storage libraries. The tracking is accomplished by providing each redundant copy of the data volume with a directly associated synchronization token. Each director 71–74 communicates with a host over an interface 69 and with a library 14 or 15 over an interface 70.

The host systems 11 and 12 are coupled to and employ the data storage library subsystem 10 for storing data, typically stored as a data volume, which is not immediately required by the hosts, for example, if the data volume is infrequently accessed. However, when the data is required, the data volumes may be accessed numerous times and continually updated. Thus, referring additionally to FIG. 4, each data storage library comprises a "virtual" library which includes a non-volatile cache storage, such as a disk drive 40, for maintaining the data volumes that have been recently accessed, and includes a backing storage, such as removable data storage media having data volumes 18, for storing data volumes for infrequent access.

Data volumes are provided to the library from a host and director, and the host waits until the virtual library writes the data volume to non-volatile cache before providing a "return" signal to the host.

The host systems 11 and 12 may be embodied by a variety of types and numbers of processing units, servers, or computing systems. The data storage libraries 14 and 15 may comprise any similar libraries for storing removable rewritable data storage media, such as magnetic tape cartridges or optical disks. An example of a suitable data storage library is the IBM 3494 Virtual Tape Server. More than two data storage libraries 14–15 may be provided, each storing one of the redundant copies of each of the redundant data volumes.

Referring to FIG. 4, the removable data storage media is stored in storage shelves 20 which are accessed by at least one robot 22 under the control of a library controller 30. The removable data storage media in storage shelves 20 containing the data volumes 18 comprise a backing storage. A plurality of data storage drives 35 allow access to read and/or write data volumes 18. The data storage library is a "virtual",library with non-volatile cache 40 coupled to the data storage drives 35. A memory 39 may comprise an electronic memory for temporarily storing the data for interfacing with the cache storage 40, or may have non-volatile capability, such as a "flash" memory, or memory with a battery for back up power, and serve as a fast cache storage, and cache storage 40 may comprise a magnetic disk drive. The library controller 30 may comprise a library manager which utilizes a database 36 to track each data volume and the data storage media on which it is stored, to track the storage shelf location 20 of each data storage media; to track each data volume in non-volatile fast cache 39 and non-volatile cache 40, and to track the synchronization tokens.

The database 36 and non-volatile cache 40 may comprise the same or different magnetic disk drives.

Communication with the library is conducted at a storage interface 38 to the library controller 30, the non-volatile fast cache 39, and to the addressed drives 35. The data storage drives 35 may comprise optical disk drives for data volumes 18 stored on optical disk or may comprise tape drives for data volumes 18 stored on magnetic tape cartridges.

Figure 5:
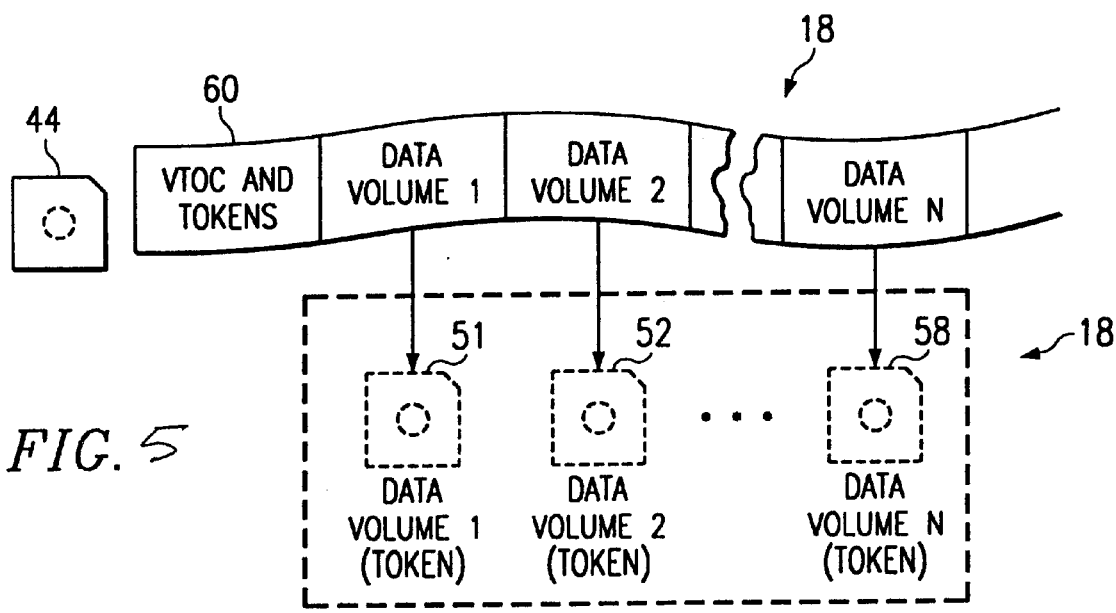
FIG. 5 is a generalized diagram of logical data volumes stored on a single physical volume for use in a data storage library of FIGS. 3 and 4.

Typically, in removable-data storage systems, a plurality of data volumes 18 are stored on a single physical data storage media, called a physical volume. FIG. 5 is a schematic representation of a physical volume 44, such as a magnetic tape in a cartridge, which contains 1 logical volumes, thereby replacing N individual-tape cartridges 51 through 58. The storage of multiple logical data volumes in a single physical volume is called "volume stacking". In one configuration, a single physical volume can include up to 140 logical volumes of 50 MB each, each of which can be individually addressed and accessed. In another configuration a single physical volume can include a variable number of logical data volumes of variable size, each of which can be individually addressed and accessed. Herein, a data volume 18 may comprise a logical volume 51, etc., or, if no logical volumes are provided, a data volume 18 may comprise a physical volume 44.

The key identifier for both logical data volumes and physical volumes is the "Volume Serial Number" or "VOLSER", comprising a predetermined number of characters or blanks. Most physical volumes have the VOLSER, or a similar identifier which is translatable to a VOLSER, encoded in a label which is on the side of the media (cartridge) which is readable by the library robot. Thus, physical volume 44 will have a VOLSER as will the logical data volumes 51 through 58. The typical data storage media 44 includes an index or a volume table of contents (VTOC) 60 which identifies each of the data volumes 18 stored on the physical volume.

In accordance with the incorporated Day III et al. application, the library controller 30 provides a synchronization token directly associated with each data volume, the synchronization token comprising an updatable token. Referring to FIGS. 4 and 5, the synchronization tokens may be directly associated with data volumes 18 by storing the tokens in the database 36, and identifying the data volumes by means of the VOLSER.

Referring to FIGS. 3 and 4, a plurality of directors 71–74 are provided, each separate from and coupled to the hosts 11–12 and each separate from and coupled to each data storage library 14–15. Each director responds to ones of separate, partitioned access addresses such as data storage drive addresses, addressed by the hosts with the supplied command. For example, director 71 responds to drive addresses 0–3, director 72 responds to drive addresses 4–7, director 73 responds to drive addresses 8-B, and director 74 responds to drive addresses C–F. The library controller 30 of each data storage library 14–15 provides an updatable synchronization token directly associated with each data volume. The responding director 71–74 supplies each data volume supplied from a host to all of the data storage libraries, and updates each synchronization token directly associated with the supplied data volume. Thus, the libraries 14–15 store duplicate copies of the data volume. The currency of the data volumes are each tracked by means of the directly associated synchronization token, and the synchronization token is not tracked by the host, but rather the synchronization token is updated by the directors and maintained in each library by the database and the database processor. If a data volume is updated, a director increments the synchronization token and supplies the updated synchronization token to the library to directly associate the synchronization token with the data volume to track the update level of the data volume. As each of the redundant copies is updated, the directly associated synchronization token is also updated, so that the currency of each of the redundant copies of the data volume is tracked by the synchronization tokens.

The library controller 30 comprises at least one programmable computer processor, such as an IBM RS-6000 processor, and is provided with an operating system and application programs for operating in accordance with the present invention. The application programs may comprise a computer program product, comprising computer readable program code. The computer program product may be supplied electronically, as from a network or one of the hosts 11–12 at communications interface 38, via a director. Alternatively, the computer program product may be supplied at an I/O station of the processor or from a storage media which stores executable computer instructions, and comprises an article of manufacture, such as data storage media 44 in FIG. 5. Another example of a storage media which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions. The operating system and application programs may be stored in the database 36.

The responding director 71–74 responds to the command and to any accompanying data volume 18 supplied by the addressing host 11–12, in turn supplying the command and accompanying data volume 18 to all of the plurality of data storage libraries 14–15, and the responding-director 71–74 updates each synchronization token directly associated with the supplied data volume.

Figures 6A, 6B:
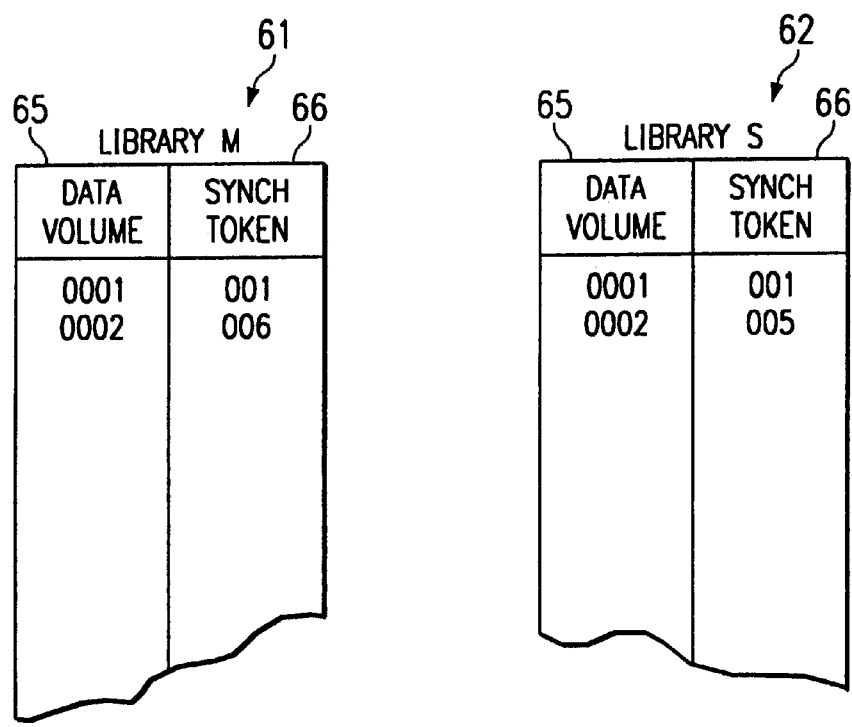
FIGS. 6A and 6B are diagrammatic representations of tables relating data volumes to synchronization tokens directly associated with the data volumes, employed with the data storage libraries of FIGS. 3 and 4.

The synchronization tokens may comprise incrementable integers, which are updated by the responding director 71–74 by incrementing each synchronization token directly associated with the supplied data volume, e.g., in column 66 in both table 61 and in table 62 of FIGS. 6A and 6B. The responding director may increment each synchronization token directly associated with the same supplied data volume to the same integer value. The director may determine the integer value by comparing the previous integer value of each synchronization token directly associated with the supplied data volume, and setting the synchronization tokens to a value incremented beyond the most current integer value indicated by the comparison.

Thus, the directors 71–74 act as a data storage library with respect to the host 11–12, and store multiple copies of the data volume 18 in the data storage libraries 14–15 without involvement by the host. The currency of the data volumes 18 are each tracked by means of the synchronization token, and the synchronization token is directly associated with the data volume 18, and is not tracked by the host 11–12.

Should one library 14–15 become unavailable, the responding director 71–74 may access the data volume 18 at another of the libraries without involvement by the host.

Specifically, each director is separate from and coupled to each data storage library, such that even a complete failure of a library does not adversely affect the directors.

The director 71–74 may update the data volume and the synchronization token at the other library, and, when the failed library becomes available and the data volume again is accessed, the responding director 71–74 will determine that the synchronization tokens do not match, will provide the most current copy to the host, and will update the data volume that was not current, again without involvement by the host.

Figure 7:
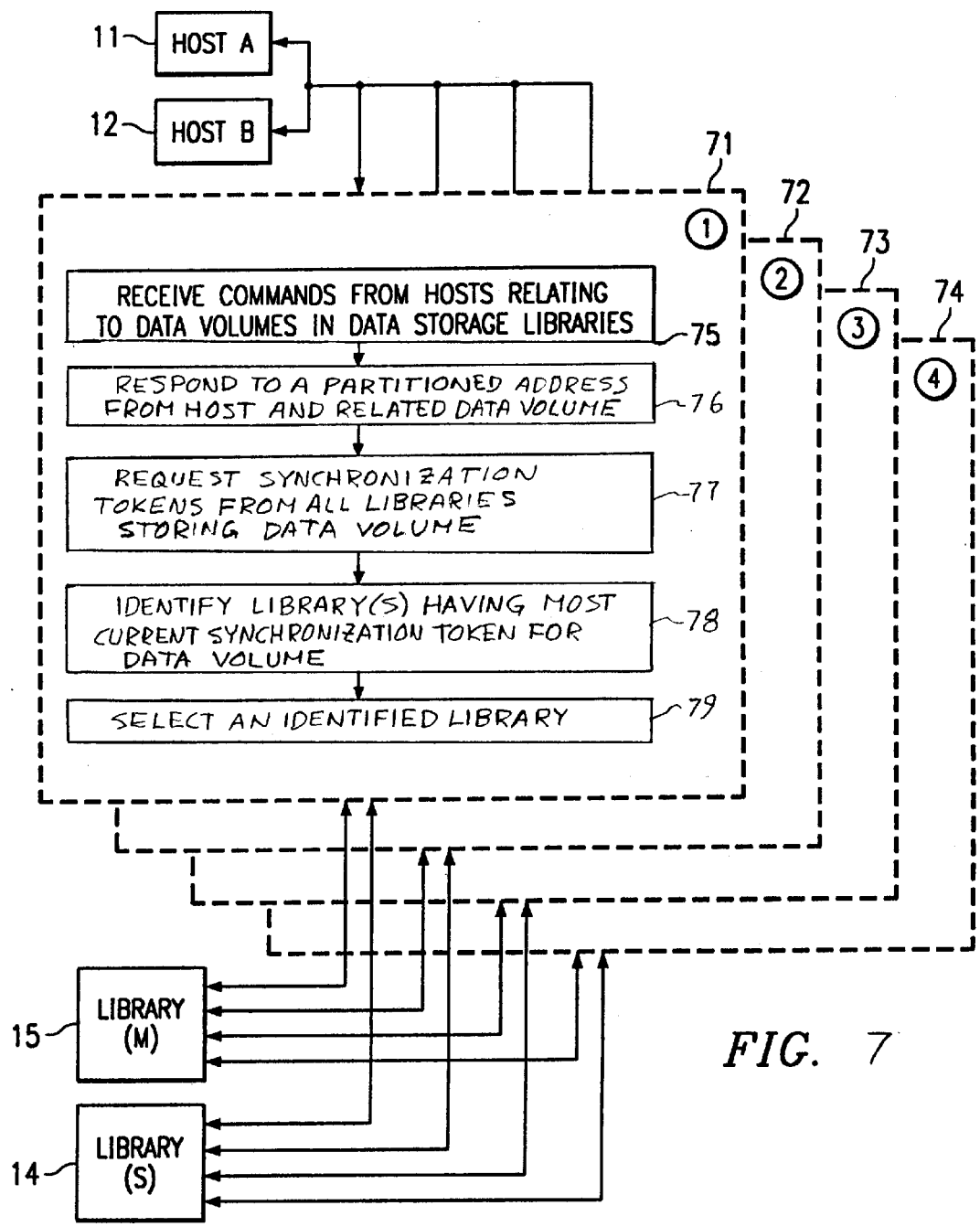
FIG. 7 is a flow chart depicting a generalized embodiment of a method of the data storage library subsystem of FIG. 3.

FIG. 7 is based upon the incorporated Day III et al. application, and as discussed therein, referring additionally to FIG. 1, the hosts 11–12 address the directors by access addresses, which may comprise data storage drive addresses, supply the data volumes to be stored, and receive the accessed data volumes. The directors, in step 75, receive commands from the hosts 11–12 relating to identifiable data volumes, and are separate from the hosts and separate from each of the data storage libraries 14–15. In step 76, the directors respond to ones of separately partitioned separated access addresses addressed by the hosts and to any accompanying data volumes. In step 77, the director which responds to a partitioned access address and to a data volume recall request, first requests synchronization tokens from all of the data storage libraries storing the data volume. Then, in step 78, the director examines the synchronization tokens received from the libraries, and identifies the library(s) having the most current synchronization token for the data volume. Lastly, in step 79, the director selects an identified library. Should more than one library have the most current synchronization token directly associated with the data volume, the director selects one of the libraries based, for example, upon a rotating basis.

Figure 8:
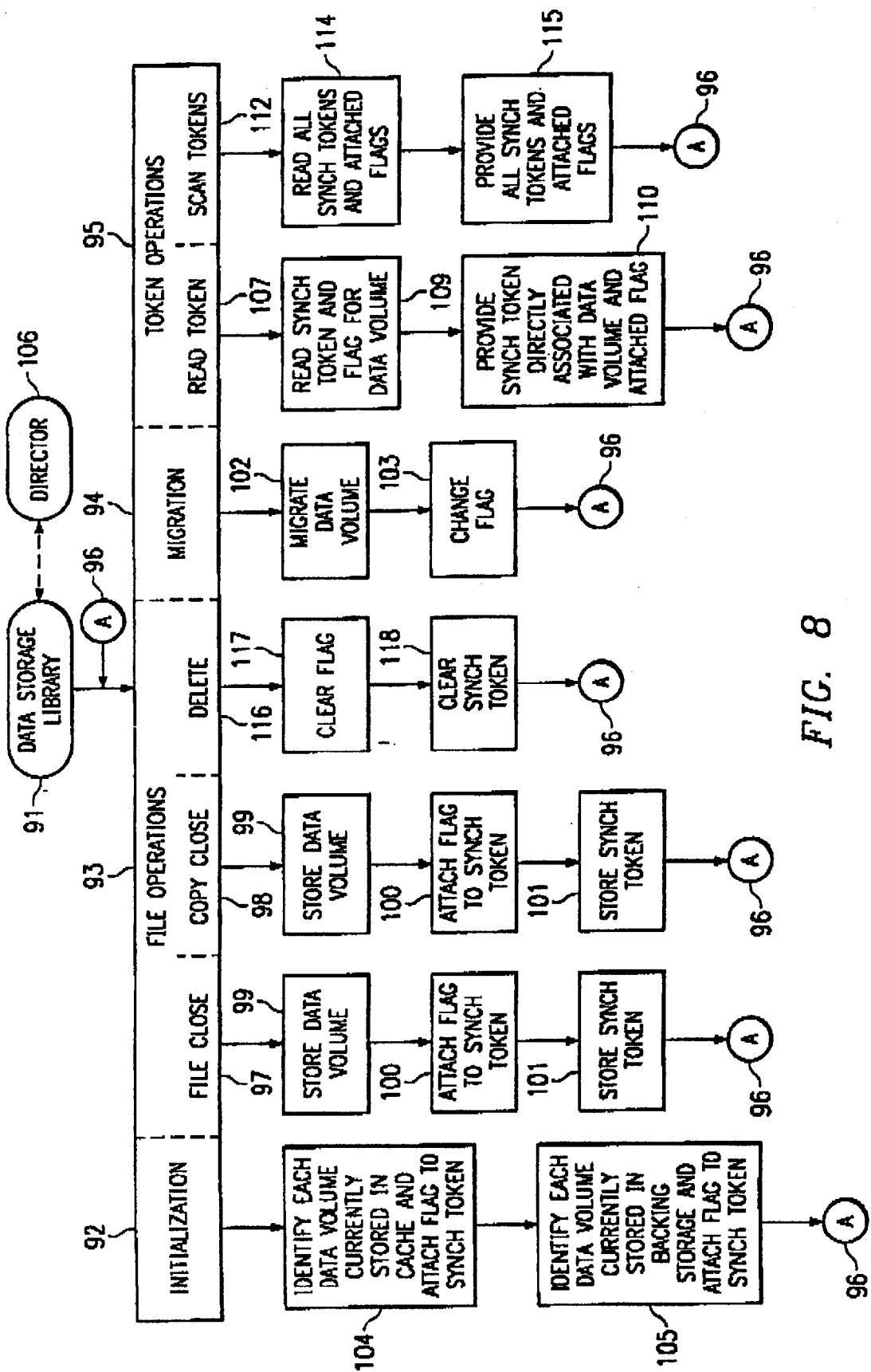
FIG. 8 is a flow chart depicting a generalized method of handling the synchronization tokens employed with the data storage library of FIG. 4.

FIG. 8 illustrates a generalized embodiment of the various operations a data storage library 91 performs involving the synchronization tokens. These operations may include initialization 92 to determine the current content of the library, file operations 93 to store or delete data volumes, migration 94 of data volumes within the library, and token operations 95. Upon completion of any one operation, connector 96 indicates that the library is ready for the next operation.

File operations 93 may include the closing of a file 97, redominately by a host, and copying a file 98, predominately from another library in accordance with commands from a director. In either case, the library stores the data volume in step 99. The data volume is stored in cache storage to save processing time, even if it will not be reaccessed shortly.

In step 100, upon the data volume being stored in cache storage, the data storage library controller attaches a cache flag indicator to the synchronization token for the data volume, identifying the data volume as stored in cache storage. In step 101, the library stores the synchronization token 66 directly associated with the data volume 65 in the table 61 or 62 of FIG. 6A or 6B.

A migration operation 94 is internal to the library and comprises migrating a data volume from cache storage 40 to backing storage 20 in step 102. The library controller 30 then changes a cache flag to indicate the migration in step 103.

An initialization operation 92 may be conducted if the flags are unknown or have not been provided. In step 104, the library identifies each data volume currently stored in cache storage 39–40, and attaches a cache flag indicator to the synchronization token. In step 105, the library identifies each data volume that has been migrated to and is currently stored in backing storage 20, and attaches the cache flag to the synchronization token indicating backing storage.

Upon a director receiving a request for a data volume at step 106, the director requests a synchronization token, and the library conducts a read token operation for the data volume at step 107. The library, in step 109, reads the synchronization token and cache flag for the data volume from the appropriate table, and provides the synchronization token directly associated with the data volume in step 110 with the cache flag of steps 100, 103, 104 or 105, depending on the location of the data volume in the library at the time of the request.

A host, director or library may request a token scan in operation 112. In step 114, the library controller reads the contents of table 61 or 62 of FIG. 6A or 6B, and, in step 115, provides all the synchronization tokens and any attached flags to the requester.

When a data volume is removed from the library in operation 116, any cache flag is cleared in step 117 the synchronization token is set to a null in step 118. Space in the table 61 or 62 of FIG. 6A or 6B is thus made available for the synchronization token for another data volume.

Maintaining the synchronization token database 36 is therefore a key element in managing the operation of each of the libraries 14–15 of the data storage system, and is in continuous operation. The token manager of the library controller 30 sets up all of the queue and table assignments and manages the synchronization tokens. Should the token manager die unexpectedly, the library controller would, without the present invention, have to be stopped and rebooted, thereby stopping the entire data handling process. Further, the reinitialization process flushes all of the queues. Referring additionally to FIG. 1, the request message queue 218 and response message queue 221 would be flushed. Thus, the messages that were received for conducting the processing of the tokens would then be lost, and it might require inventories and/or initializations 92 of both libraries in order to find the prior update status of each data volume, so that the most recent messages could be reestablished. For example, an IBM 3494 Virtual Tape Server generates a "CHECK1" when any major process dies, stopping the operation of the library controller, and reboots the controller.

Examples of problems that may lead to a "CHECK1" include receiving a request that cannot be handled, a memory leak in which a process uses too much memory so that the operating system kills the process, or a segmentation violation where the operation goes beyond the allocated code. Additionally, there is possible manual intervention where it is necessary to install a new version or to update some of the code. Without the present invention, it may take 10–20 minutes to bring the library down and quiesce the systems and install the new load and restart.

Referring to FIGS. 1 and 2, the input/outputs 215–217 comprise, in the token manager, tape "ELFs" such as described in coassigned U.S. Pat. No. 5,911,148, each of which is the interface operating a specific aspect of library activity and provides commands or messages to manage the database 36.

In the event of a termination of the token manager, the present invention allows the library to continue to run without a stoppage by quickly restarting the token manager when the watchdog 225 brings it back.

As discussed above, an input message is received at one of the input "ELFs" 215–217 in step 235, and, in step 236, the input message is loaded into the request message queue 218. The input process then cycles back to step 235 for the next input message.

The startup processor 233 checks the in-process message queue in step 242, and, if the queue is empty, in step 237, the next input message from the request message queue is read by the message reader 219.

In-accordance with the present invention, in step 238, the message read from the request message queue by the message reader, is copied into the in-process message queue 220. In accordance with conventional practice, the message will have been deleted from the request message queue 218 when it was read by the message reader 219. Thus, the input message is protected temporarily in the in-process message queue.

The processing of the database specified by the "ELF" in the message is then initiated in step 239 and conducted in step 240, resulting in a completion response in step 241. As discussed above, the watchdog 225 monitors the process in step 243. For example, the watchdog may wait a predetermined time from the time the message was read from the request message queue 218, looking for a valid completion response at the response message queue 221 in step 241.

If the process completes normally in a reasonable time, step 245 determines whether the computer message processor 200 is in normal mode. If the processed message came from the request message queue 218 as the result of step 237, the processor is in a normal mode, and not in a restart mode. Thus, in step 246, the process deletes the message from the in-process message queue, indicating that the process of the message has been completed and the message does not require protection and cycles back, via connector 247, for the next message.

If, however, the watchdog, in step 243, detects a problem with the process, or if a termination input is provided at input 231 in step 248, the terminate/restart processor 230, in step 250, terminates the process, ordering the operating system to kill the computer message processor and verifies that the computer message processor has terminated.

Subsequently, in accordance with the present invention, upon completion of any action as the result of the termination, the terminate/restart processor 230, which may be implemented in the watchdog 225, in step 251, starts a computer message processor 233, which, in step 242, because it is restarting, reads, in step 253, the next message from the messages saved in the in-process message queue 220 by the message reader 219, so that the processing of messages begins at the same point that the termination occurred.

In accordance with the present invention, the message read from the in-process message queue in step 253 is deleted from the queue in step 255. The process is again initiated in step 239, leading to step 240 to perform the operation of the message. Again, watchdog 225, in step 243, monitors the process. Should a termination occur during the processing of the message read in step 253 and the computer message processor restarted in step 251, the message will have been deleted from the in-process message queue in step 255 and is lost. Thus, an infinite retry loop is prevented, and step 253 reads the next available message from the in-process message queue.

Upon completion of the process of step 240 and the completion response of step 241 for the message of step 253, step 245 determines that the computer message processor is in restart mode and returns to step 242. Then in step 242, the in-process message queue 220 is checked to determine if the just processed message was the last message in the queue. If there is a message in the queue, "YES", the next available message is read from the in-process message queue in step 253. If the in-process message queue has been depleted and all messages have been deleted in steps 255, "NO" in step 242, the process leads back to step 237 to read the next available message from the request message queue 218.

Thus, the startup processor 233 first operates the message reader 219 to read the all of the input messages from the in-process message queue 220 and, only upon reads all the saved input messages from the in-process message queue, reads the new input messages from the request message queue 218.

The database processing messages are protected so as to allow a termination and restart of the token manager without requiring a system-wide reboot, bringing down the entire library. The library will appear to be operating at a slightly reduced level, and will then resume normal operation, and the library system will continue essentially unaffected.

Alternative applications of the present invention may be envisioned by-those of skill in the art.

While the preferred embodiments of the present invention have been illustrated in detail, it should be apparent that modifications and adaptations to those embodiments may occur to one skilled in the art without departing from the scope of the present invention as set forth in the following claims.

I claim:

1. A computer message processor for protecting database processing messages during a termination and restart, comprising:

a message reader for reading input messages;

A an in-process message queue coupled to said message reader, receiving a copy of each said read input message;

a completion response detector coupled to said in-process message queue, monitoring a valid completion response message to each said read input message, and, upon detecting said valid completion response message, deleting said copied input message from said in-process message queue; and a startup processor coupled to said message reader, responsive to a startup signal for restarting said computer message processor after a termination, operating said message reader to read said copied input messages from said in-process message queue, and, in response to said restarting said computer message processor and said reading said copied input messages in said in-process message queue, deleting each said copied input message that has been read from said in-process message queue by said startup processor, whereby said deletion thereby prevents said accessing of said copied input message upon a second said restart.

2. The computer message processor of claim 1, additionally comprising a request message queue receiving said input messages and coupled to said message reader for said reading of said input messages, said input message subject to deletion from said request message queue upon being read; and wherein said startup processor first operates said message reader to read said input messages from said in-process message queue and, upon reading all said input messages from said in-process message queue, reading said input messages from said request message queue.

3. The computer message processor of claim 2, additionally comprising a token manager of a data storage library, said library having synchronization tokens directly associated with data volumes stored in said data storage library, said tokens stored in a database of said data storage library, wherein said input messages relate to said synchronization tokens, said token manager responding to said read input messages, managing operations affecting said synchronization tokens.

4. The computer message processor of claim 1, additionally comprising a watchdog monitor, monitoring operations conducted in response to said read input messages, until completion as identified by said valid completion response message, for a termination of said operation or a failure to complete said operation within a predetermined time period; and, upon detecting said termination or said failure to complete an operation, stopping all of said operations from said read input messages thereby failing said valid completion response messages, and providing said startup signal.

5. The computer message processor of claim 1, additionally comprising a termination input processor responding to a termination input, terminating operations conducted in response to said read input messages, and subsequently providing said startup signal.

6. A method for protecting database processing messages during a termination and restart, comprising the steps of:

reading an input message;

copying said read input message into an in-process message queue;

monitoring a valid completion response message to said read input message;

upon detecting a monitored valid completion response message to said input message, deleting said copied input message from said in-process message queue; and upon receiving a startup signal for restarting after a termination, accessing said copied input message from said in-process message queue; reading said copied input message, and, in response to said startup signal for restarting and said reading said copied input message, deleting said copied input message that has been read from said in-process message queue upon restart, whereby said deletion thereby prevents said accessing of said copied input message upon a second said restart.

7. The method of claim 6, additionally comprising the initial step of receiving each said input message, placing said input message in a request message queue; wherein said input message reading step additionally comprises reading said input message from said request message queue, said input message subject to deletion from said request message queue upon being read; and wherein said startup accessing step additionally comprises first reading messages from said in-process message queue and, upon reading all said messages from said in-process message queue, reading input messages from said request message queue.

8. The method of claim 7, wherein said input messages relate to synchronization tokens directly associated with data volumes stored in a data storage library, said synchronization tokens stored in a database of said data storage library, and additionally comprising the steps of responding to said read input messages, managing operations affecting said synchronization tokens.

9. The method of claim 6, additionally comprising the steps of: monitoring operations conducted in response to said read input messages, until completion as identified by said valid completion response message, for a termination of said operation or a failure to complete said operation within a predetermined time period; and, upon detecting said termination or said failure to complete an operation, stopping all of said operations from said read input messages thereby failing said valid completion response messages, and providing said startup signal.

10. The method of claim 6, additionally comprising the steps of:

responding to a termination input, terminating operations conducted in response to said read input messages, and subsequently providing said startup signal.

11. A computer program product usable with a programmable computer processor having computer readable program code embodied therein, for protecting database processing messages during a termination and restart, comprising:

computer readable program code which causes said programmable computer processor to read an input message;

computer readable program code which causes said programmable computer processor to copy said read input message into an in-process message queue;

computer readable program code which causes said programmable computer processor to monitor a valid completion response message to said read input message, and upon detecting a monitored valid completion response message to said input message, deleting said copied input message from said in-process message queue; and computer readable program code which causes said programmable computer processor to, upon receiving a startup signal for restarting after a termination, access said copied input message from said in-process message queue, reading said copied input message, and, in response to said receiving said startup signal for restarting and said reading said copied input message, deleting said copied input message that has been read from said in-process message queue upon restart, whereby said deletion thereby prevents said accessing of said copied input message upon a second said restart.

12. The computer program product of claim 11, wherein said computer readable program code causes said programmable computer processor to initially receive each said input message, placing said input message in a request message queue; wherein said computer readable program code which causes said programmable computer processor to read said input message additionally causes said programmable computer processor to read said input message from said request message queue, said input message subject to deletion from said request message queue upon being read; and said computer readable program code which causes said programmable computer processor to access said copied input message in response to said startup signal additionally causes said programmable computer processor to first read messages from said in-process message queue and, upon reading all said messages from said in-process message queue, to read input messages from said request message queue.

13. The computer program product of claim 12, wherein said programmable computer processor additionally comprises a token manager of a data storage library, said library having synchronization tokens directly associated with data volumes stored in said data storage library, said tokens stored in a database of said data storage library, wherein said input messages relate to said synchronization tokens; wherein said computer readable program code additionally causes said programmable computer processor to respond to said read input messages, managing operations affecting said synchronization tokens.

14. The computer program. product of claim 11, wherein said computer readable program code additionally causes said programmable computer processor to: monitor operations conducted in response to said read input messages, until completion as identified by said valid completion response message, for a termination of said operation or a failure to complete said operation within a predetermined time period; and, upon detecting said termination or said failure to complete an operation, to stop all of said operations from said-read input messages thereby failing said valid completion response messages, and providing said startup signal.

15. The computer program product of claim 11, wherein said computer readable program code additionally causes said programmable computer processor to: respond to a termination input, terminating operations conducted in response to said read input messages, and subsequently providing said startup signal.

16. A data storage library for accessing redundant copies of identifiable data volumes, said redundant copies stored in a plurality of said data storage libraries, said redundant copies accessed in response to access requests, said identifiable data volumes each directly associated with an updatable synchronization token, said synchronization token indicating the relative update levels of said directly associated redundant copies, said library receiving input messages relating to said synchronization tokens, said library comprising:

backing storage for storing and accessing said identifiable data volumes;

an input for receiving said input messages; and a library controller for managing said backing storage, and said library controller managing said synchronization tokens in response to said received input messages relating to said synchronization tokens, said library controller:

reading an input message;

copying said read input message into an in-process message queue;

monitoring a valid completion response message to said read input message;

upon detecting a monitored valid completion response message to said input message, deleting said copied input message from said in-process message queue; and upon receiving a startup signal for restarting after a termination, accessing said copied input message from said in-process message queue, reading said copied input message, and, in response to said receiving said startup signal for restarting and said reading said copied input message, deleting said copied input message that has been read from said in-process message queue upon restart, whereby said deletion thereby prevents said accessing of said copied input message upon a second said restart.

17. The data storage library of claim 16, wherein said library controller additionally initially receives each said input message, placing said input message in a request message queue; wherein said reading of said input message additionally comprises reading said input message from said request message queue, said input message subject to deletion from said request message queue upon being read; and wherein said startup accessing additionally comprises first reading messages from said in-process message queue and, upon reading all said messages from said in-process message queue, reading input messages from said request message queue.

18. The data storage library of claim 16, wherein said library controller additionally monitors operations conducted in response to said read input messages, until completion as identified by said valid completion response message, for a termination of said operation or a failure to complete said operation within a predetermined time period; and, upon detecting said termination or said failure to complete an operation, stops all of said operations from said read input messages thereby failing said valid completion response messages, and provides said startup signal.

19. The data storage library of claim 16, wherein said library controller additionally responds to a termination input, terminating operations conducted in response to said read input messages, and subsequently provides said startup signal.

* * * * *

UNITED STATES PATENT AND TRADEMARK OFFICE
CERTIFICATE OF CORRECTION

PATENT NO. : 6,640,247 B1
DATED : October 28, 2003
INVENTOR(S) : Kishi

It is certified that error appears in the above-identified patent and that said Letters Patent is hereby corrected as shown below:

<u>Column 4,</u>
Line 13, paragraph beginning "The response" should not be a new paragraph <u>Column 11,</u>
Line 40, change "In-accordance" to -- In accordance --

<u>Column 12,</u>
Line 65, delete "A" and change "an" to -- An --

<u>Column 15,</u>
Line 39, change "said-read" to -- said read --

Signed and Sealed this

Twenty-third Day of December, 2003

JAMES E. ROGAN
*Director of the United States Patent and Trademark Office*